United States Patent
Uematsu et al.

(10) Patent No.: US 7,642,520 B2
(45) Date of Patent: Jan. 5, 2010

(54) METHOD FOR MEASURING RANDON AND THORON IN AIR

(75) Inventors: Kazuyoshi Uematsu, Niigata (JP); Mineo Sato, Niigata (JP); Masatoshi Ota, Niigata (JP); Kenji Toda, Niigata (JP)

(73) Assignee: Niigata University, Niigata (JP)

( * ) Notice: Subject to any disclaimer, the term of this patent is extended or adjusted under 35 U.S.C. 154(b) by 0 days.

(21) Appl. No.: 12/303,501

(22) PCT Filed: Dec. 13, 2006

(86) PCT No.: PCT/JP2006/324798

§ 371 (c)(1),
(2), (4) Date: Dec. 4, 2008

(87) PCT Pub. No.: WO2007/141895

PCT Pub. Date: Dec. 13, 2007

(65) Prior Publication Data
US 2009/0200473 A1 Aug. 13, 2009

(30) Foreign Application Priority Data
Jun. 6, 2006 (JP) .............................. 2006-157321

(51) Int. Cl.
*G01T 1/22* (2006.01)
(52) U.S. Cl. .................... 250/380; 250/375; 250/DIG. 2
(58) Field of Classification Search ................. 250/374, 250/375, 380, DIG. 2
See application file for complete search history.

(56) References Cited

U.S. PATENT DOCUMENTS

| 4,224,177 A | 9/1980 | Macedo et al. |
| 4,920,270 A | 4/1990 | Grodzins |

FOREIGN PATENT DOCUMENTS

| JP | 53-146715 | 12/1978 |
| JP | 63-241375 | 10/1988 |
| JP | 01-098986 | 4/1989 |
| JP | 04-270985 | 9/1992 |
| JP | 06-258443 | 9/1994 |
| JP | 06-258450 | 9/1994 |

(Continued)

OTHER PUBLICATIONS

Uematsu et al., "Cherenkov-ko o Riyoshita Radon Sokutei Hoho no Kaihatsu", Isotope Hoshasen Kenkyu Happyokai Yoshishu, vol. 43, Jun. 20, 2006, p. 138.

*Primary Examiner*—David P Porta
*Assistant Examiner*—David S Baker
(74) *Attorney, Agent, or Firm*—Darby & Darby P.C.

(57) ABSTRACT

A novel method for measuring airborne radon and thoron capable of separately measuring radon and thoron with high sensitivity, having a small-sized device structure, and free of the influence from its measurement environment. In the method, by measuring Cherenkov light generated when airborne radon and thoron are adsorbed to an absorbent and then β rays emitted in process of disintegrations of radon and thoron pass through the absorbent, radon and thoron are measured. Based on a decay time of the Cherenkov light, a mixture ratio between radon and thoron is measured. As the absorbent, porous glass is preferably employed which is provided with fine pores of 0.3 to 30 nm in diameter.

4 Claims, 6 Drawing Sheets

FOREIGN PATENT DOCUMENTS

| | | |
|---|---|---|
| JP | 08-136660 | 5/1996 |
| JP | 08-136661 | 5/1996 |
| JP | 08-136662 | 5/1996 |
| JP | 08-136663 | 5/1996 |
| JP | 08-201523 | 8/1996 |
| JP | 2003-194945 | 7/2003 |
| WO | WO 2004061448 A1 * | 7/2004 |

* cited by examiner

METHOD FOR MEASURING RANDON AND THORON IN AIR

CROSS REFERENCE TO RELATED APPLICATION

This is the U.S. National Phase Application under 35 U.S.C. § 371 of International Patent Application No. PCT/JP2006/324798, filed Dec. 13, 2006 and claims benefit of Japanese Patent Application No. 2006-157321, filed Jun. 6, 2006. The International Application was published in Japanese on Dec. 13, 2007 as International Publication No. WO 2007/141895 under PCT Article 21(2), and all preceding applications are incorporated herein in their entirety.

TECHNICAL FIELD

The present invention relates to a method for measuring radon and thoron which are in the air.

BACKGROUND ART

Radon (Rn-222) denotes a radioactive nuclide generated by the disintegration of uranium-series radium (Ra-226) and its half-life period is 3.824 days. Thoron (Rn-220) denotes a radioactive nuclide generated by the disintegration of thorium-series radium (Ra-224) and its half-life period is 55.6 seconds. These elements are both an inert gas and these origins are uranium (U-234) and thorium (Th-232) which occur in the earth crust, respectively.

Radon and thoron which have been generated in the earth crust are in the form of gas and therefore they leach out of the ground to the earth's surface or emerge on the ground together with groundwater. Then, if air ventilation is poor in highly airtight houses, insides of tunnels, underground shopping areas or the like, concentrations of radon and thoron reach a high level in some cases. The radiation exposure to which general public are subjected from the natural world in a year is said to be about 2.4 mSv. The exposure of a lung to the radiation caused by radon, thoron and their daughter radionuclides is said to account for approximately half of the exposure of 2.4 mSv. Accordingly, effects of the exposure due to these nuclides on a human body are concerned.

By the way, with respect to a method for measurement of airborne radon and thoron, an ionization chamber method, a scintillation cell method, an electrostatic collection type chamber method, a filter method and a still-standing-type measurement method have been presently put into practical use.

According to the ionization chamber method, a chamber with a capacity of 1 to 300 L is employed, and the method includes two, i.e., a method by measuring an ionized current and a method for measuring by using pulse. In order to increase the detection sensitivity of the methods, the capacity of the chamber should be enlarged and therefore the methods are unsuitable to perform high sensitive measurement in the field. Hence, the methods are often utilized as a measuring instrument for calibration. Consequently, in general, it is difficult to separately measure radon and thoron, using the methods.

According to the scintillation cell method, a device is employed which comprises a chamber having an inner wall to which fluorescent materials (ZnS:Ag) are applied and a photomultiplier tube connected optically to the chamber. Its measurement accuracy is proportional to a cell volume. When the cell volume is large, however, light from the fluorescent material becomes unable to reach the photomultiplier tube, thus putting restrictions on the cell volume. Further, unless radon concentration is comparatively high, it cannot be measured. Consequently, in general, radon and thoron are difficult to separately measure.

According to the electrostatic collection type chamber method, a spherical, hemispherical, or cylindrical chamber is employed. A mylar thin film is laid on a chamber bottom and a negative voltage is applied thereto, while a positive voltage is applied to a chamber wall. Polonium (Po-218), a daughter radionuclide of radon, is caught on the mylar film and detected. Radon and thoron can be separately measured but the measurement is strongly affected by humidity.

According to the filter method, the daughter radionuclides of radon and thoron which are in the atmosphere are collected directly on a filter to measure α rays emitted from the daughter radionuclides. In this method, radon is not directly collected and hence the equilibrium between radon and its daughter radionuclides must be estimated and the estimation could be an error factor. Further, according to the two-stage filter method, lowering of a measurement value due to the wall loss effect of the daughter radionuclides inside the chamber will pose a problem.

According to the still-standing (passive)-type method, resin such as polycarbonate or the like is laid as a detector inside a measurement container made of metal or the like. After having been atmospherically exposed for a preset period of time, the resin inside the detector is chemically etched to measure radon from α ray's solid state tracks developed there. The device used for this method is small-sized and hence a large number of the devices can be laid simultaneously at many measurement points and besides radon and thoron can be discriminated by using a filter or the like. Its detection sensitivity, however, is low and therefore the device needs to be atmospherically exposed typically for two moths or more. For the sake of reproducibly developing the solid state tracks, the chemical etching condition should be strictly controlled.

Other known prior art references are:
Japanese unexamined patent publication No. H6-258443;
Japanese unexamined patent publication No. H6-258450;
Japanese unexamined patent publication No. H8-136660;
Japanese unexamined patent publication No. H8-136661;
Japanese unexamined patent publication No. H8-136662;
Japanese unexamined patent publication No. H8-136663; and
Japanese unexamined patent publication No. H8-201523.

As described above, various types of measurement methods have conventionally been put into practical use as the radon and thoron measurement methods. Either method, however, have had some sort of problems.

Therefore, in view of the problems set forth above, it is an object of the present invention to provide a novel method for measuring airborne radon and thoron in which a measurement device structure is small-sized and which is free of the influence from its measurement environment.

SUMMARY OF THE INVENTION

As a result of a wide variety of researches for solving the above problems, the inventors of the present invention have completed the present invention, by focusing the attentions on the fact that nuclides which emit high-energy β rays exist among a series of daughter radionuclides generated in process of disintegrations of radon and thoron.

Namely, according to a method for measuring airborne radon and thoron set forth in a first aspect of the present invention, at least either airborne radon or thoron is adsorbed to an absorbent to measure Cherenkov light generated when β rays emitted in process of disintegration of either radon or thoron pass through the absorbent, thereby measuring at least either radon or thoron.

According to the method for measuring airborne radon and thoron as set forth in a second aspect of the present invention, in the method set forth in the first aspect, a mixture ratio between radon and thoron is measured based on a decay time of the Cherenkov light.

According to the method for measuring airborne radon and thoron set forth in a third aspect of the present invention, in the method set forth in the first or second aspect, the absorbent is made of porous glass.

According to the method for measuring airborne radon and thoron set forth in a fourth aspect of the present invention, in the method set forth in the third aspect, the absorbent is provided with fine pores of 0.3 to 30 nm in diameter.

According to the method for measuring airborne radon and thoron set forth in the first aspect of the present invention, concentrations of radon and thoron can be measured with high sensitivity.

According to the method for measuring airborne radon and thoron set forth in the second aspect of the present invention, radon and thoron can be separately measured with ease.

According to the method for measuring airborne radon and thoron set forth in the third aspect of the present invention, radon and thoron can be reliably collected to enable the Cherenkov light to be reliably observed.

According to the method for measuring airborne radon and thoron set forth in the fourth aspect of the present invention, radon and thoron can be reliably collected.

DETAILED DESCRIPTION OF THE INVENTION

Hereunder is a description of one embodiment of a method for measuring airborne radon and thoron according to the present invention.

Figure 1:
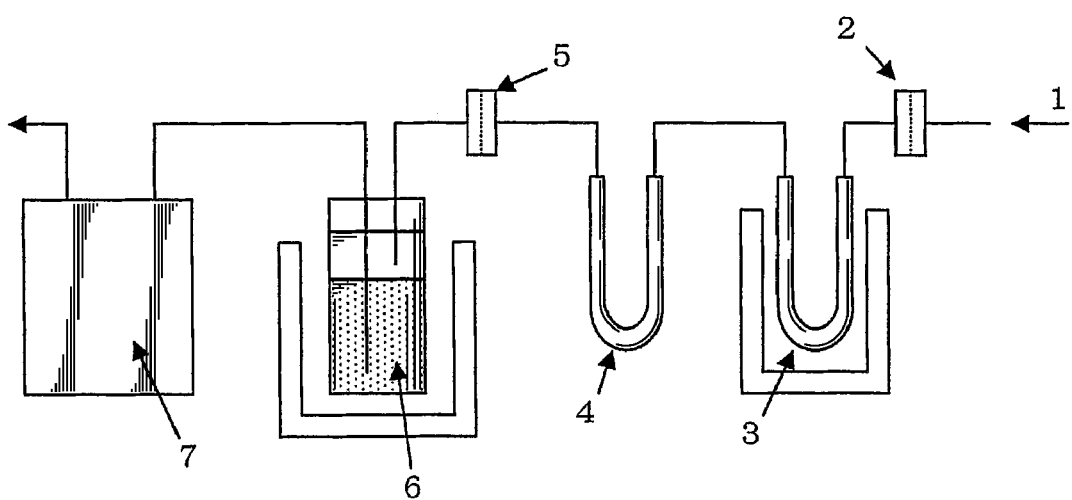
FIG. 1 is a schematic diagram illustrating one example of an airborne radon and thoron collection device employed for a method for measuring airborne radon and thoron according to the present invention.

FIG. 1 represents one embodiment of an airborne radon and thoron collection device employed for a method for measuring airborne radon and thoron according to the present invention. Numeral symbol 1 denotes an air inlet 1 for sucking air containing radon and thoron. In a numerical order from the air inlet 1, series-connected are a membrane filter 2 for eliminating air dust and air daughter radionuclides of radon and thoron, a trap 3 and an exsiccant 4 which have been cooled to 0 deg C. by ice water for eliminating moisture therein, a membrane filter 5 for eliminating air dust and the air daughter radionuclides of radon and thoron, porous glass 6, acting as an absorbent, to sorb radon and thoron, and a constant rate pump 7 for sucking a certain amount of air. Here, the porous glass 6 is provided with fine pores of 0.3 to 30 nm in diameter and has been cooled to sub-zero by being bathed in a dry ice and alcohol mixture or by means of an electronic cooler. Accordingly, the porous glass 6 can reliably sorb airborne radon and thoron which pass through the porous glass 6. Besides, the porous glass 6 is housed in a counting vial used for a liquid scintillation counter.

Then, a certain amount of air sucked by the constant rate pump 7 enters the air inlet 1 and the dust and airborne daughter radionuclides of radon and thoron are eliminated by the membrane filter 2. Afterward, the air passes through the trap 3 and the exsiccant 4 and further passes through the membrane filter 5 and then enter the porous glass 6 to sorb radon and thoron.

The radon and the thoron which have been adsorbed to the porous glass 2 produce β ray emitting radionuclides in process of their disintegrations. In other words, bismuth (Bi-214) in radon and bismuth (Bi-212) in thoron act as a β ray emitter in radon and in thoron, respectively. After having sucked a given amount of air, the porous glass 6 is allowed to return to room temperature and then the Cherenkov light is measured under the Cherenkov light measurement condition by using a general-purpose liquid scintillation counter. By quantitatively measuring the Cherenkov light emitted from the bismuth (Bi-214) and the bismuth (Bi-212), concentrations of radon and thoron can be learned.

Here, the Cherenkov light is explained. When a charged particle passes through matter, the velocity v of the charged particle is larger than the speed (c/n, c: the speed of light in vacuum, n: a refractive index of matter) of light within the matter (c/n, c: the speed of light in vacuum, n: a refractive index of matter), light is generated along the track of the charged particle passing through the matter. This phenomenon is called Cherenkov effect and the light generated is called Cherenkov light. The larger the refractive index of matter and besides the larger the energy of the charged particle (chiefly a β particle, i.e., an electron), the more easily the Cherenkov light is generated.

In the present embodiment, as a material in which the Cherenkov light is easy to be generated, the porous glass provided with fine pores of 0.3 to 30 nm in diameter is employed as the absorbent. The porous glass is transparent and has a large refractive index and therefore acts as a material easy to sorb radon and thoron. Particularly, quartz porous glass provided with fine pores of 0.3 to 30 nm in diameter has high sorbabilty of radon and thoron to be preferably employed. In addition, an absorbent applicable to the method of the present invention is not limited to this porous glass and another material may be applicable. As an absorbing material, a transparent and large-refractive-index material is preferably applicable and e.g., translucent ceramics, a high-polymer material and so on are applicable.

Figure 2:
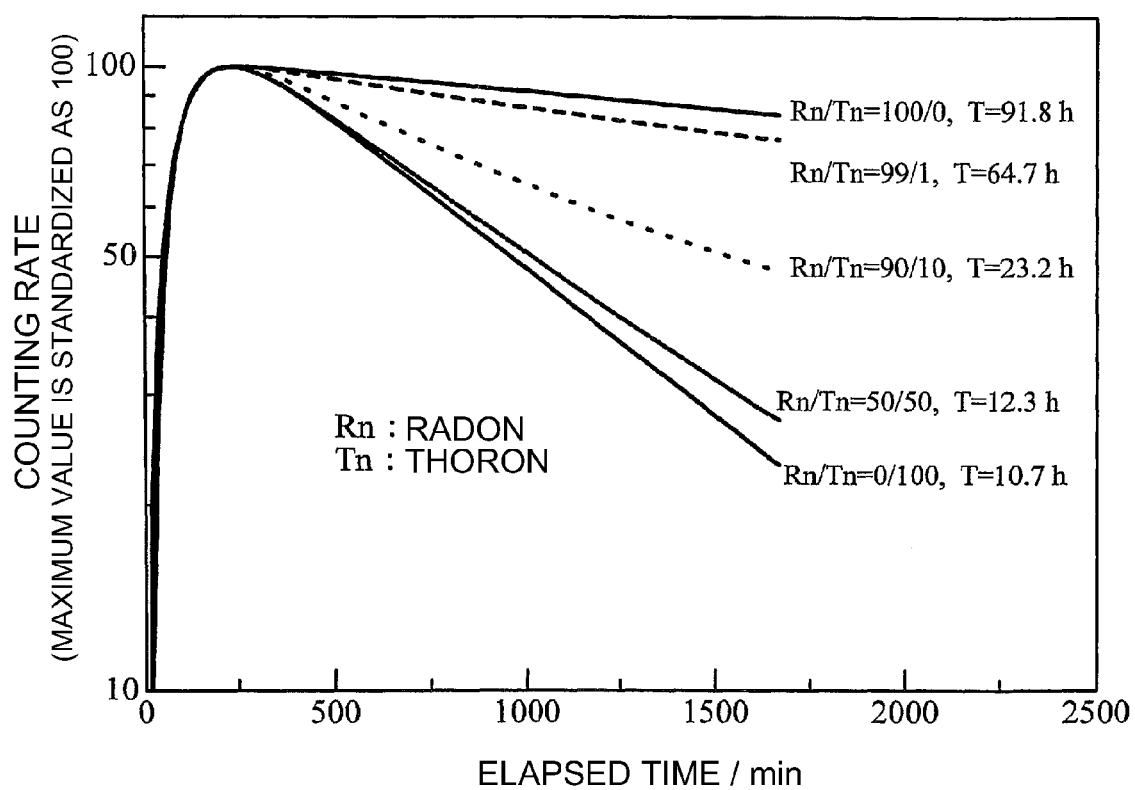
FIG. 2 is a graph showing a simulation result of a temporal change in Cherenkov light when a counting rate of a temporal change in radon and thoron is varied.

FIG. 2 represents a simulation result of a time course in the generation of Cherenkov light from moments after radon, thoron and a mixed gas of these elements have been separated from radium that is the parent nuclide of these elements. It is learned that in both cases of radon and thoron, a maximum value is exhibited at about 200 minutes after the separation and thereafter the maximum value descends. Determining a half-life period from the gradient of the decay process, 91.8 hours and 10.7 hours were obtained in radon and in thoron, respectively. From these results, it follows that the half-life period (91.8 hours) of radon in radon itself and the half-life period (10.64 hours) of lead (Pb-212) in thoron act as rate controlling, determining the decay speeds of both the elements.

Further, when having varied a counting ratio between radon and thoron, the gradient is large owing to thoron with a short half-life period at the early phase and subsequently the gradient becomes moderate due to radon with a long half-life period, proving that the gradient of the decay process is determined by the ratio between radon and thoron. By determining a gradient within triple of the half-life period (within about 30 hours) of thoron, the ratio between radon and thoron can be approximately determined.

In an actual measurement, a time-variable curve of a counting rate can be obtained by multiple measurements at intervals of several hours and thereby the concentration of radon and thoron can be obtained from a relationship between measurement time and a counting value and besides the ratio between radon and thoron can be obtained from the gradient of the curve.

As stated above, in the method for measuring airborne radon and thoron according to the present invention, airborne radon and thoron are adsorbed to the absorbent to measure the Cherenkov light generated when β rays emitted in process of the disintegrations of radon and thoron pass through the absorbent and thereby the radon and the thoron are measured. Thus, the concentrations of radon and thoron can be measured with high sensitivity.

Further, based on the decay time of the Cherenkov light, the mixture ratio of radon and thoron is measured, thus permitting radon and thoron to be separately measured with ease.

Furthermore, as the absorbent is made of porous glass, radon and thoron are reliably collected, allowing the Cherenkov light to be reliably observed.

Moreover, as the absorbent is provided with the fine pores of 0.3 to 30 nm in diameter, radon and thoron can be reliably collected.

Thus, the method for measuring airborne radon and thoron according to the present invention is a more novel method than ever before. In addition to the advantages stated above, the method has advantages of, discharging no hazardous organic waste liquid such as toluene due to utilizing no liquid scintillator, enabling the measurement not by a special device such as an α ray spectrometer but by a general-purpose liquid scintillation measurement device, making it possible to repeatedly use the absorbent by waiting for the decay of the daughter radionuclides of radon and thoron which have been adsorbed thereto, or performing otherwise functions.

In addition, the present invention is not limited to the above embodiment and various modifications are possible without departing the gist of the present invention.

Hereunder, a more detailed description of the embodiment is given based on specified examples.

EXAMPLE 1

Figure 3:
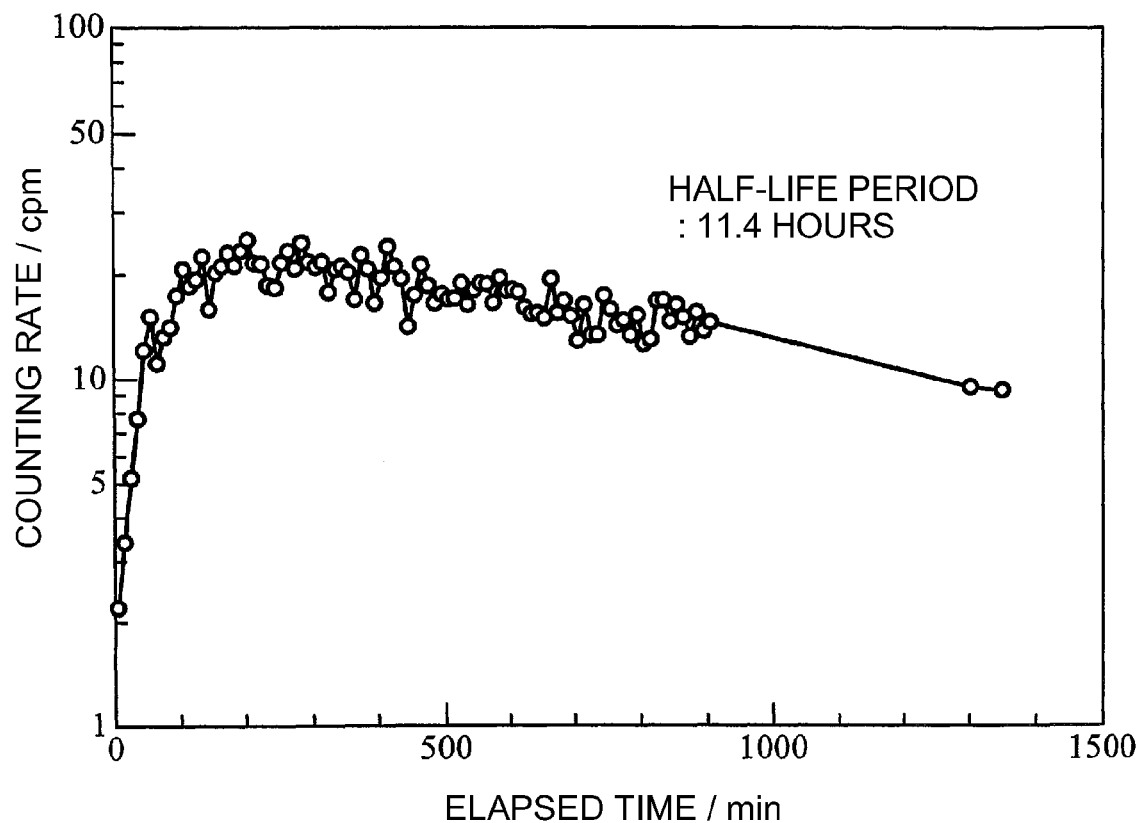
FIG. 3 is a graph illustrating a temporal change in the Cherenkov light in a first embodiment.

Air in a container in which a mantle for lanthanum that is a product including much thorium had been hermetically stored was sucked and collected using the collection device shown in FIG. 1. Then, Cherenkov light was measured to show the result in FIG. 3. At this time, the sucked air volume was 3 L and the sucking speed was 0.5 L/min.

The same curve as that obtained from the simulation in FIG. 2 was obtained and hence it was verified that radon and thoron could be measured by measuring the Cherenkov light. Calculating a half-life period from the gradient of the decay process of the curve obtained, the half-life period was determined as 11.4 hours and then by bringing the hours into check with the simulation result shown in FIG. 2, the measurement ratio of radon/thoron was proved to be about 80/20.

In addition, the mantle for lanthanum means mesh-like glass fiber which is fitted on a gasoline burner used in a camp or the like to be utilized as lighting and is known to contain a comparatively large volume of thorium oxide.

EXAMPLE 2

Figure 4:
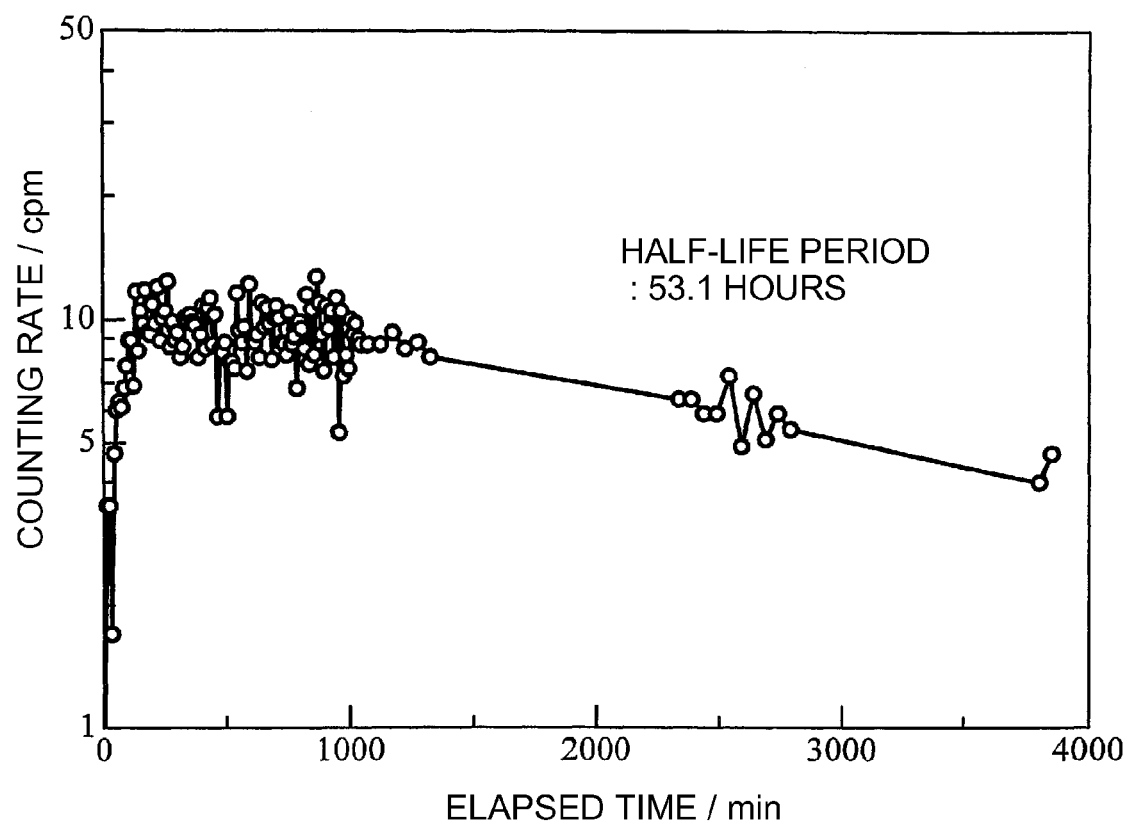
FIG. 4 is a graph illustrating a temporal change in the Cherenkov light in a second embodiment.

FIG. 4 represents a measurement result of radon and thoron which have been generated from a phosphate rock known to contain a comparatively large amount of uranium. Without using the collection device shown in FIG. 1 for collecting air, air within a container in which the phosphate rock is hermetically stored was collected by a syringe in a quantity of 20 mL and then the collected air was injected into a vial in which an absorbent made of porous glass had been put. Then, Cherenkov light was measured.

The same result as that in the first embodiment was obtained. Then, determining a half-life period from the gradient of the decay process, about 53.1 hours was obtained. Bringing the half-life period into check with the simulation curve in FIG. 2, the measurement ratio of radon/thoron proved to be about 98.5/1.5.

EXAMPLE 3

Figure 5:
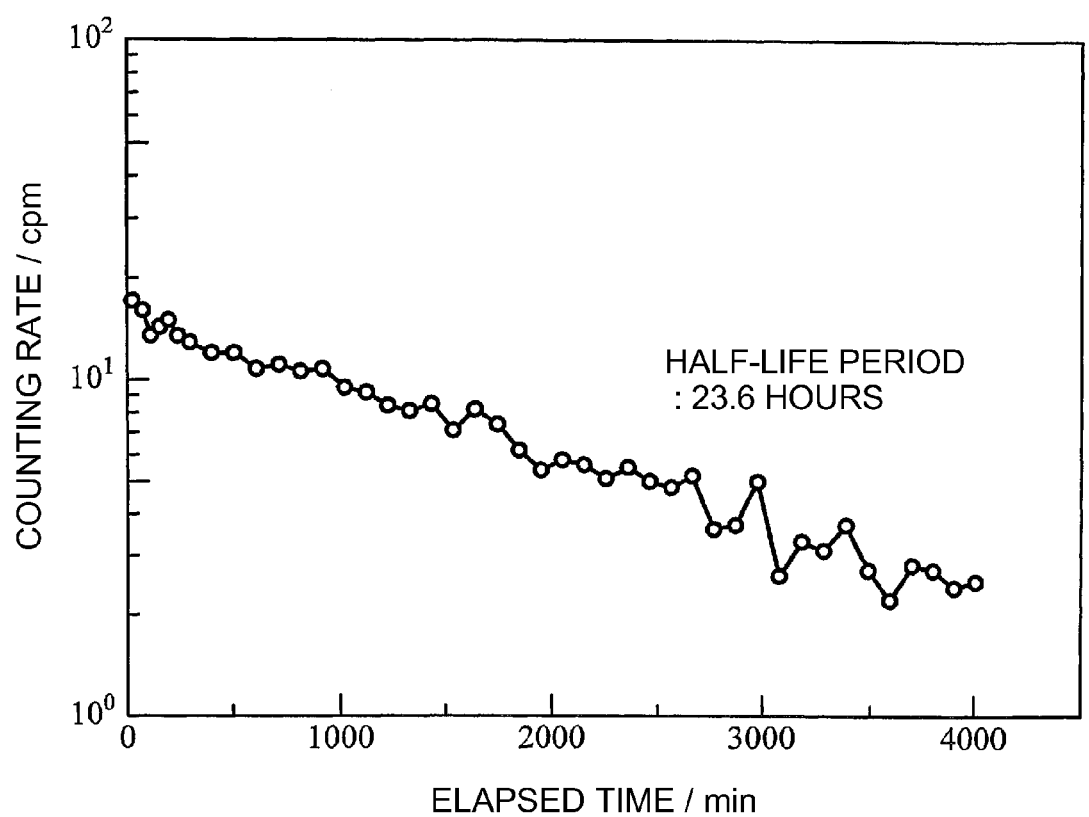
FIG. 5 is a graph illustrating a temporal change in the Cherenkov light in a third embodiment.

After having had sucked and collected air existing 5 cm high on the floor of an underground inspection pit (an underground passage for inspection, a bottom house of 1 floor) of a concrete house by using the collection device shown in FIG. 1, Cherenkov light was measured. The result of the measurement is shown in FIG. 5. At this time, the sucked air volume was 60 L and the sucking velocity was 0.5 L/min.

Determining a half-life period from the gradient of the decay process, the half-life period was 23.6 hours. Bring the hours into check with the simulation result in FIG. 2, the measurement ratio of radon/thoron proved to be about 90/10.

EXAMPLE 4

Figure 6:
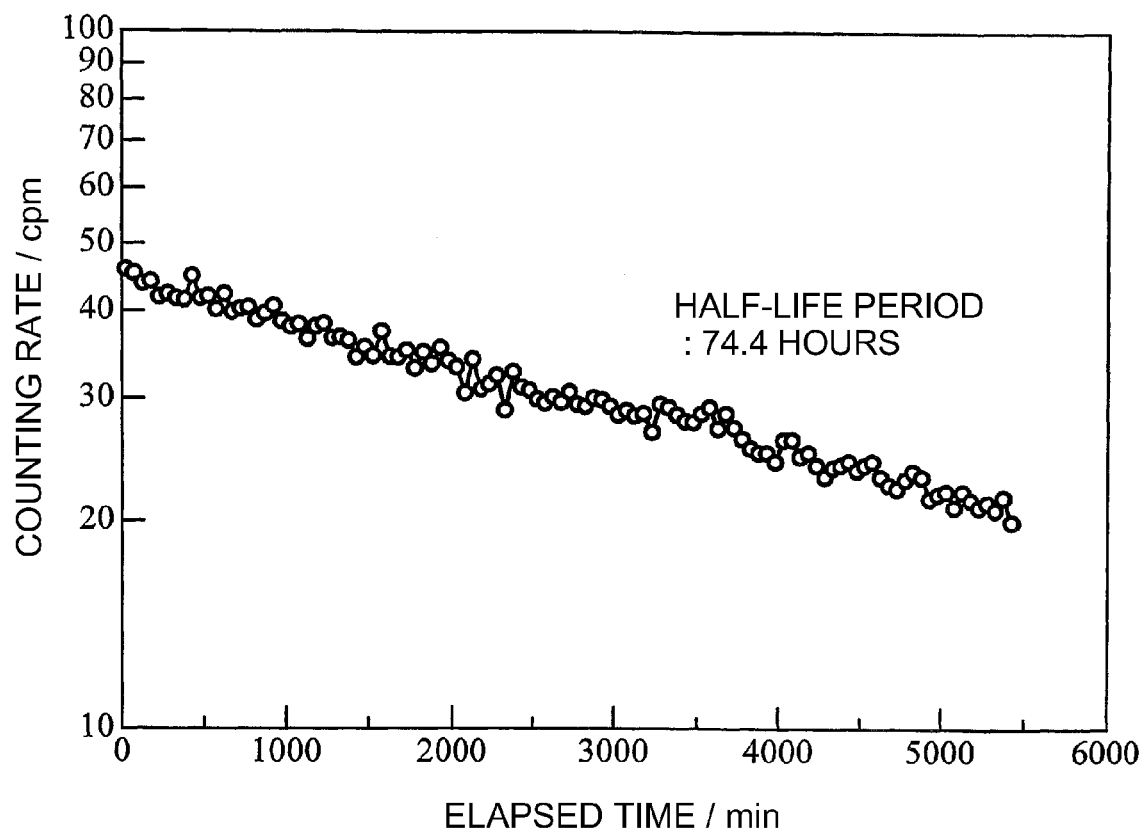
FIG. 6 is a graph illustrating a temporal change in the Cherenkov light in a fourth embodiment.

In order to eliminate the influence by thoron whose half-life period is short (55.6 sec), a structure was built in which after having made the sucked air pass through a tank with a capacity of 5 L, the passed air was adsorbed to an absorbent. Then, the air was sucked in the same way as was done in the third embodiment to measure Cherenkov light. The measurement result of the Cherenkov light is shown in FIG. 6. At this time, the sucked air volume was 90 L and the sucking velocity was 0.5 L/min.

Determining a half-life period from the decay process, about 74.4 hours was obtained. Then, bringing this half-life period into check with the simulation result shown in FIG. 2, the measurement ratio of radon/thoron was 99.3/0.7 and therefore most of thoron was proved to be eliminated.

The invention claimed is:

1. A method for measuring airborne radon and thoron, comprising the steps of:
    absorbing at least either one of radon and thoron to an absorbent; and
    measuring Cherenkov light generated when β rays emitted in process of disintegration of at least either one of radon and thoron pass through said absorbent.

2. The method for measuring airborne radon and thoron according to claim 1, further comprising the step of measuring a mixture ratio between radon and thoron based on a decay time of Cherenkov light.

3. The method for measuring airborne radon and thoron according to claim 1, wherein said absorbent is made of porous glass.

4. The method for measuring airborne radon and thoron according to claim 3, wherein said absorbent is provided with fine pores of 0.3 to 30 nm in diameter.

* * * * *

UNITED STATES PATENT AND TRADEMARK OFFICE
CERTIFICATE OF CORRECTION

PATENT NO.           : 7,642,520 B2                                                        Page 1 of 1
APPLICATION NO.  : 12/303501
DATED                    : January 5, 2010
INVENTOR(S)          : Kazuyoshi Uematsu et al.

It is certified that error appears in the above-identified patent and that said Letters Patent is hereby corrected as shown below:

On the cover page item [54] and Col. 1, the title should be "METHOD FOR MEASURING RADON AND THORON IN AIR".

Signed and Sealed this

Twenty-third Day of February, 2010

David J. Kappos
*Director of the United States Patent and Trademark Office*